Dec. 19, 1944.   E. H. FISCHER   2,365,535
METHOD OF FORMING TAPPED HOLES IN PORCELAIN
Filed May 20, 1943

WITNESSES:

INVENTOR
Eugene H. Fischer.
BY
ATTORNEY

Patented Dec. 19, 1944

2,365,535

UNITED STATES PATENT OFFICE 2,365,535

METHOD OF FORMING TAPPED HOLES IN PORCELAIN

Eugene H. Fischer, Derry, Pa., assignor to Westinghouse Electric & Manufacturing Company, East Pittsburgh, Pa., a corporation of Pennsylvania Application May 20, 1943, Serial No. 487,803

5 Claims. (Cl. 25—156)

The present invention relates to the manufacture of porcelain articles and, more specifically, to the manufacture of such articles having a screw-threaded hole therein.

It is usual in the manufacture of this type of article to drill a hole in the green ware, before firing, and tap or otherwise form screw threads on the inner surface of the hole. However, due to the character of the materials involved, that is, essentially granular, it is almost impossible to tap a hole having unbroken smooth and continuous threads. Usually in the formation of the thread or the removal of the tap, portions of the thread will crumble. After firing, of course, such a thread presents an uneven surface which is apt to tear the metal of the screw inserted in it, or the thread itself may break.

Accordingly, it is an object of the invention to provide a porcelain article having a smooth unbroken thread in or through a hole therein and a method of making such an article.

Figure 1:
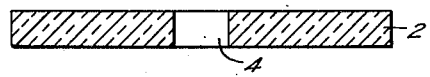

The accompanying drawing diagrammatically illustrates the practice of the invention. Fig. 1 is a view in section of an unfired ceramic body having a hole therethrough, Fig. 2 is a view in section of said article being treated in accordance with the invention, and Fig. 3 is a view in section of the article after the threading operation.

According to the invention a porcelain article of any desired shape may be formed by pressing, casting, or otherwise, in accordance with known practice, and a hole of the desired diameter is formed therein after the article dries. In the case of cast ware the hole may be drilled in it after drying, or if the article is formed by the process described in my Patent 2,301,939, issued November 17, 1942, the hole may be formed by a suitable die projection during the pressing operation. An article 2, so formed, may be indicated in Fig. 1, by way of example, with a hole 5 therethrough.

Figure 2:
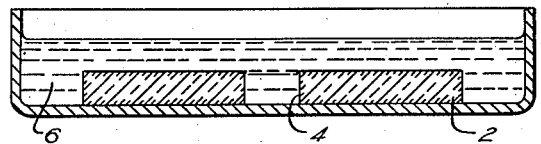

After the article is thoroughly dried it may be immersed as in Fig. 2, or at least a portion thereof containing the hole may be immersed, in a bath 6 of molten paraffin wax to thoroughly impregnate the wall of the hole 4. Preferably a paraffin wax melting at 100° C. or above, of types now on the market, is used and it will solidify, of course, at room temperature, or 70° to 100° F. It is contemplated, of course, that other materials may be used such as the terpenes, including rosins and modified rosins. The prime requirement is that the material shall be of low viscosity when melted and will solidify at room temperature.

Figure 3:

After solidification of the paraffin, or other similar material, the hole is tapped in a usual manner to form the screw-threads, as indicated in Fig. 3.

The articles with the tapped and impregnated hole may then be fired at usual porcelain firing temperatures, in the region of 1200° C. At such temperatures, of course, the paraffin or equivalent material will volatilize and leave the porcelain article. It is important that material used shall volatilize without leaving ash of any kind in the porcelain, and materials of the types above-mentioned, by way of example, meet this requirement.

After firing, the solidified article has a threaded hole with smooth and unbroken threads. It is possible that in the tapping operation the impregnation in the hole wall serves as a binder and lubricant to facilitate turning the thread without tearing.

It is understood that variations in the above described procedure will present themselves to those skilled in the art and it is intended that the invention be limited only by the scope of the appended claims.

I claim as my invention:

1. The method of forming a threaded hole in a dried ceramic article comprising forming an article of unfired porcelain material with a hole therein, treating at least that portion of the article containing said hole with melted material of low viscosity to impregnate the wall of said hole, said material being of a character that solidifies at room temperature and volatilizes at the usual firing temperatures of porcelain materials, tapping a thread in said impregnated wall after solidification of said material, and subsequently firing said article.

2. The method of forming a threaded hole in a ceramic article comprising forming an article of unfired porcelain material with a hole therein, drying said article, treating at least that portion of the article containing said hole with melted material of low viscosity to impregnate the wall of said hole, said material being such that it solidifies at above room temperature, volatilizes at normal firing temperatures for porcelain materials, and is ash-free at such firing temperatures, tapping a thread in said impregnated wall after solidification of said material, and subsequently firing said article.

3. The method of forming a threaded hole in a ceramic article comprising forming an article of unfired porcelain material, drying said article, drilling a hole of desired diameter in said article, treating at least that portion of the article containing said hole with melted material of low viscosity to impregnate the wall of said hole, said material being such that it solidifies at above room temperature and serves to lubricate the wall of said hole, volatilizes at normal firing temperatures for porcelain materials, and is ash-free at such firing temperatures, tapping a thread in said impregnated wall after solidification of said material, and subsequently firing said article.

4. The method of making a ceramic article comprising forming a batch of granular ceramic material to a desired shape preparatory to firing including forming a hole therein, drying said formed article, impregnating at least the wall of the hole with melted paraffin wax, permitting said wax to solidify, tapping a screw thread into said impregnated hole wall, and then firing said article to vitrify it.

5. In treating an unfired body of granular ceramic material having a hole therein, the method of forming a screw-thread in said hole comprising submerging at least the portion of the body containing said hole in melted wax to impregnate the wall of said hole, and cutting said thread in said impregnated wall.

E. H. FISCHER.